United States Patent [19]

Numazawa et al.

[11] 4,404,869
[45] Sep. 20, 1983

[54] POWER TRANSMISSION UNIT FOR MOTOR VEHICLES

[75] Inventors: Akio Numazawa, Nagoya; Hajime Arai, Aichi, both of Japan

[73] Assignee: Toyota Jidosha Kogyo Kabushiki Kaisha, Toyota, Japan

[21] Appl. No.: 226,532

[22] Filed: Jan. 19, 1981

Related U.S. Application Data

[63] Continuation of Ser. No. 954,121, Oct. 24, 1978, abandoned.

[30] Foreign Application Priority Data

Apr. 20, 1978 [JP] Japan .................................. 53/47336

[51] Int. Cl.³ .............................................. F16H 37/00
[52] U.S. Cl. ..................................... 74/740; 74/781 R
[58] Field of Search ................... 74/740, 701, 781 R, 74/762

[56] References Cited

U.S. PATENT DOCUMENTS

| | | | |
|---|---|---|---|
| 2,177,952 | 10/1939 | Snow | 74/740 |
| 2,548,761 | 4/1951 | Armantrout | 74/740 |
| 2,593,629 | 4/1952 | Swift | 74/740 |
| 2,644,550 | 7/1953 | Flinn | 74/781 R |
| 2,663,199 | 12/1953 | Harrison | 74/781 R |
| 2,699,073 | 1/1955 | Flinn | 74/781 R |
| 2,768,534 | 10/1956 | Orr | 74/740 |
| 2,971,395 | 2/1961 | Orr | 74/781 R |
| 3,126,765 | 3/1964 | Conkle | 74/781 R |
| 3,318,168 | 5/1967 | De Coye de Castelet | 74/331 |
| 3,321,988 | 5/1967 | Peras | 74/325 |
| 3,429,202 | 2/1969 | Galicher | 74/740 |
| 3,592,080 | 7/1971 | Samatov et al. | 74/740 |
| 3,837,237 | 9/1974 | Rossler et al. | 74/740 |
| 3,906,817 | 9/1975 | Kreitzberg | 74/740 |
| 3,916,727 | 11/1975 | Piret | 74/762 |
| 3,924,491 | 12/1975 | Kalversberg | 74/762 |
| 4,041,805 | 8/1977 | Jochmann | 74/740 |
| 4,056,986 | 11/1977 | Hobbs | 74/701 |
| 4,074,592 | 2/1978 | Stevens et al. | 74/740 |
| 4,106,364 | 8/1978 | Zenker et al. | 74/740 |
| 4,174,644 | 11/1979 | Nagy et al. | 74/701 |
| 4,368,650 | 1/1983 | Numazawa et al. | 74/781 R |

FOREIGN PATENT DOCUMENTS

| | | |
|---|---|---|
| 553346 | 2/1958 | Canada .................................. 74/701 |
| 1078720 | 8/1967 | United Kingdom . |
| 1165859 | 10/1969 | United Kingdom . |
| 1178244 | 1/1970 | United Kingdom . |

Primary Examiner—Leslie A. Braun
Assistant Examiner—Joseph M. Rolnicki
Attorney, Agent, or Firm—Parkhurst & Oliff

[57] ABSTRACT

A power transmission unit for a motor vehicle comprises an auxiliary transmission for selectively completing low and high speed drive power trains, the auxiliary transmission having an input shaft drivingly connected to an output shaft of an engine through a disengageable coupling, a primary transmission arranged between the disengageable coupling and the auxiliary transmission and having a main sleeve shaft in surrounding relationship to the input shaft and a countershaft arranged in parallel with the main sleeve shaft, the main sleeve shaft being connected with an output member of the auxiliary transmission and provided integral with a plurality of drive gears for selectively driving respective change-speed gears on the countershaft, and a final drive gearing drivingly connected to the countershaft to drive a differential gear unit.

3 Claims, 3 Drawing Figures

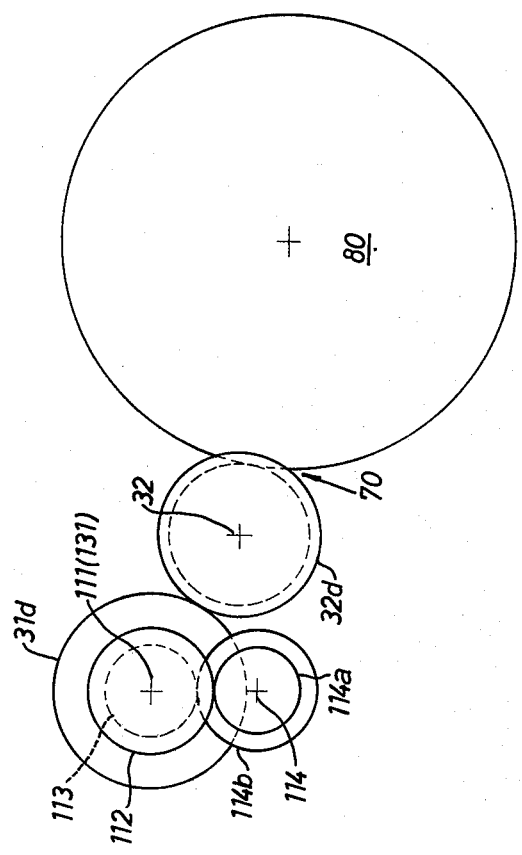

POWER TRANSMISSION UNIT FOR MOTOR VEHICLES

This is a continuation of application Ser. No. 954,121 filed Oct. 24, 1978 now abandoned.

BACKGROUND OF THE INVENTION

The present invention relates to a power transmission unit for motor vehicles, and more particularly to an improvement of a power transmission unit of the type which comprises an auxiliary transmission for selectively completing low and high speed drive power trains and a primary transmission for selectively completing a plurality of forward drive power trains and a reverse drive power train after one of the low and high speed drive power trains is completed.

In such a power transmission unit as described above, when the primary transmission is shifted to a desired position after completion of a low speed drive power train, a suitable change-speed ratio can be selected to obtain good drivability during travel of the vehicle on town roads or mountain roads. When the primary transmission is shifted to a desired position after completion of a high speed drive power train, a suitable change-speed ratio can be selected to obtain good drivability during travel of the vehicle on a highway. Thus, the power transmission unit of this type is very useful to ensure good drivability without unnecessary fuel consumption under various travelling conditions. In case the power transmission unit is adapted to a small automotive vehicle of front-wheel drive type, it is needed that the transmission unit is designed to be assembled within a limited space of the vehicle.

SUMMARY OF THE INVENTION

It is, therefore, a primary object of the present invention to provide an improved transmission unit in which the auxiliary transmission is constructed by relative small and light-weight component parts to be assembled in a limited space.

Another object of the present invention is to provide an improved transmission unit in which an input shaft of the auxiliary transmission acts as a torsion bar to reduce unpleasant shocks given to the transmission unit.

A further object of the present invention is to provide an improved transmission unit in which the auxiliary transmission can easily be removed from the transmission unit only to use the primary transmission.

According to the present invention there is provided a power transmission unit for a motor vehicle comprising:

an auxiliary transmission for selectively completely low and high speed drive power trains, the auxiliary transmission having an input shaft drivingly connected to an output shaft of an engine through a disengageable coupling;

a primary transmission arranged between the disengageable coupling and the auxiliary transmission and having a main sleeve shaft in surrounding relationship to the input shaft and a countershaft arranged in parallel with the main sleeve shaft, the main sleeve being connected with an output member of the auxiliary transmission and provided integral with a plurality of drive gears for selectively driving respective change-speed gears on the countershaft; and a final drive gearing drivingly connected to the countershaft to drive a differential gear unit.

BRIEF DESCRIPTION OF THE DRAWINGS

Additional objects and advantages of the present invention will be more readily apparent from the following detailed description of preferred embodiments thereof when taken together with the accompanying drawings in which:

FIG. 3 is a diagrammatic end view of the power transmission unit of FIG. 2, showing the different shaft axes and their relative positions, as well as the meshing engagement occuring between the various gears.

DESCRIPTION OF THE PREFERRED EMBODIMENTS

Figure 1:
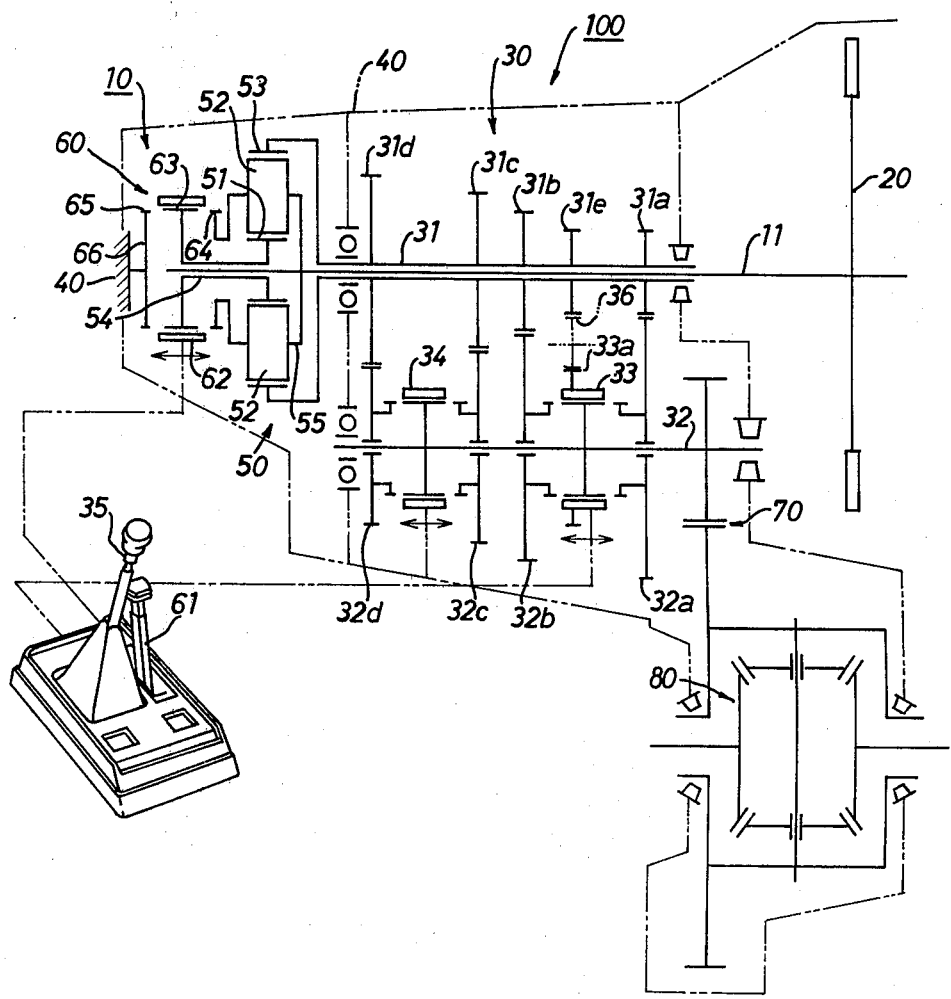
FIG. 1 is a schematic skeleton view showing an embodiment of a power transmission unit according to the present invention.

Referring now to the drawings, in particular to FIG. 1, there is schematically illustrated a power transmission unit 100 for a motor vehicle of the engine, front-wheel drive type in which an internal combustion engine is arranged in a plane transversely of the longitudinal vehicle axis. The transmission unit 100 includes a primary transmission 30 with change-speed gears and an auxiliary transmission 10 with a single planetary gear set 50. The auxiliary transmission 10 has an input shaft 11 drivingly connected to a crankshaft of the engine by way of a friction clutch 20, and the primary transmission 30 has a main sleeve shaft 31 in surrounding relationship to the input shaft 11. The main shaft 31 serves as an output shaft of the auxiliary transmission 10 and as an input shaft of the primary transmission 30. The sleeve shaft 31 is rotatably supported from a transmission housing 40 between the friction clutch 20 and the auxiliary transmission 10 and is also provided integral with first, second, third and fourth drive gears 31a, 31b, 31c and 31d and with a reverse drive gear 31e.

The planetary gear set 50 of auxiliary transmission 10 includes a sun gear 51 which is integral with a sleeve shaft 54 in surrounding relationship to the input shaft 11. Planet gears 52 are rotatably supported by a carrier member 55 integral with the input shaft 11 and are in mesh with the sun gear 51 and a ring gear 53. The ring gear 53 is securedly connected with the main sleeve shaft 31. The auxiliary transmission 10 further comprises a selector gear unit 60 which is provided to determine a drive power train of the planetary gear set 50. The selector gear unit 60 is operatively connected with a manual selector lever 61 which has three positions corresponding respectively to Neutral, Low and High speed drive power trains. The selector gear unit 60 further includes a slide 62 having thereon an inner spline selectively engageable with a spline 63, with the spline 63 and spline 64 or with the spline 63 and a spline 65. The splines 63, 64 and 65 are formed integral with the sleeve shaft 54, the carrier member 55 and a reaction member 66 respectively. The reaction member 66 is securedly mounted on a portion of the transmission housing 40, and the slide sleeve 62 is operatively connected with the selector lever 61 by means of any suitable mechanical linkage.

The primary transmission 30 comprises a countershaft 32 which is rotatably supported from the transmission housing 40 in parallel with the main sleeve shaft 31. The countershaft 32 is drivingly connected to a differential gear unit 80 by way of a final drive gearing 70.

Four change-speed gears 32a, 32b, 32c and 32d are rotatable on the countershaft 32 and in mesh with the first, second, third and fourth drive gears 31a, 31b, 31c and 31d respectively. A first synchronizer 33 is operatively connected with a shift lever 35 to selectively establish meshing engagements of the change-speed gears 32a and 32b with the countershaft 32. The first synchronizer 33 is also provided integral with a reverse gear 33a which is selectively engaged with the reverse driving gear 31e through a reverse idler gear 36. A second synchronizer 34 is further operatively connected with the shift lever 35 to selectively establish meshing engagements of the change-speed gears 32c and 32d with the countershaft 32.

In operation of the power transmission 100, when the slide sleeve 62 is shifted by the selector lever 61 in a rightward direction, it is brought into engagement with the splines 63 and 64 to connect the carrier member 55 with the sleeve shaft 54. As a result, the sun gear 51 rotates together with the carrier member 55, and the main sleeve shaft 31 rotates at the same speed as that of the input shaft 11 to complete a low speed drive power train. Then, the primary transmission 30 acts to transmit drive torque from the engine to the final drive gearing 70 in accordance with shifting operation of the first or second synchronizer. Thus, a suitable change-speed ratio is obtainable for the torque transmission to ensure good drivability without unnecessary fuel consumption during travel of the vehicle on town roads or mountain roads.

When the slide sleeve 62 is shifted by the selector lever 61 in a leftward direction, it is brought into engagement with the splines 63 and 65 to connect the sleeve shaft 54 with the reaction member 66. As a result, the sun gear 51 is locked to the transmission housing 40, and the main sleeve shaft 31 rotates at a speed higher than that of the input shaft 11 to complete a high speed drive power train. Then, the primary transmission 30 acts to transmit drive torque from then engine to the final drive gearing 70 in accordance with shifting operation of the first or second synchronizer. Thus, a suitable change-speed ratio is obtainable for the torque transmission to ensure good drivability without unnecessary fuel consumption during travel of the vehicle on a highway. In this instance, if the travel speed of vehicle is equal to that under the low speed drive power train, the rotational speed of engine will decrease.

Figure 2:
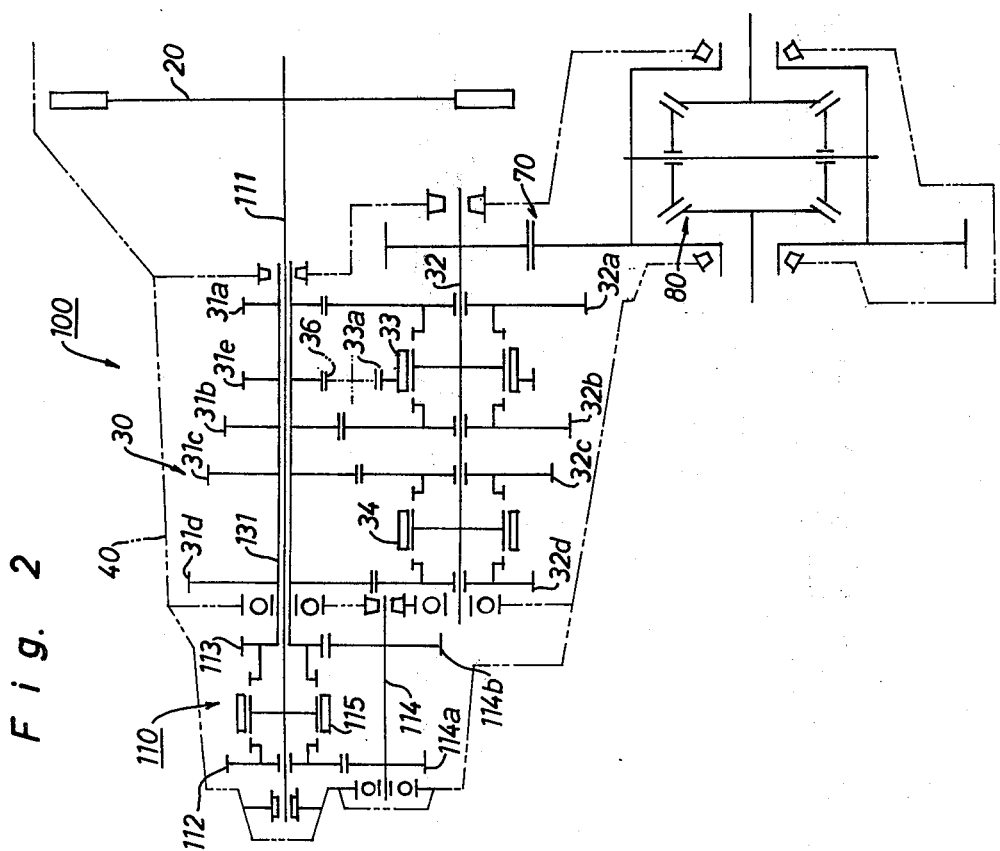
FIG. 2 is a schematic skeleton view showing another embodiment of the power transmission.

FIG. 2 illustrates another embodiment of the present invention in which an auxiliary transmission 110 of the counter-gear type is adapted to complete low and high speed drive power trains. The auxiliary transmission 110 includes a gear 112 of large diameter rotatable on an input shaft 111 and a gear 113 of small diameter integral with a main sleeve shaft 131, the input shaft 111 and main sleeve shaft 131 corresponding respectively with the input shaft 11 and main sleeve shaft 31 of the previous embodiment. A countershaft 114 is rotatably supported from the transmission housing 40 in parallel with the input shaft 111 and is provided integral with a counter-gear 114a of small diameter and a counter-gear 114b of large diameter which are in engagement with the gears 112 and 113 respectively. The auxiliary transmission 110 is further provided with a slide sleeve 115 which is operatively connected with a selector lever (not shown) to provide a drive connection between the gear 112 and the input shaft 111 or between the gear 113 and the input shaft 111. All other constructions remain unchanged and same reference numerals are used for the same component parts and portions of the previous embodiment. In FIG. 2, although the shafts 111, 114, 131 and 32 and the differential gear unit 80 are illustrated in a common plane to clearly depict meshing engagement of the respective gears, they are arranged in practice as shown in FIG. 3 to be assembled in a limited space.

In operation of the auxiliary transmission 110, when the slide sleeve 115 is shifted to connect the input shaft 111 with the right-hand gear 113, the main sleeve shaft 131 rotates together with the input shaft 111 to complete a low speed drive power train. When the slide sleeve 115 is subsequently shifted to connect the input shaft 111 with the left-hand gear 112, the rotational speed of main sleeve shaft 131 increases due to a predetermined gear ratio of the gears 112, 114a, 114b and 113, completing a high speed drive power train. All other operational features and procedures are the same as in the previous embodiment and no repetition is made hereinafter.

As is understood from the above description, the auxiliary transmission 10 or 110 is arranged between the input shaft 11 or 111 and the main sleeve shaft 31 or 131 of the primary transmission 30 to directly receive drive torque from the engine thereon. This means that the auxiliary transmission may be constructed by relative small and lightweight component parts to be assembled in a limited space. The above embodiments are further characterized in that the input shaft 11 or 111 is elongated through the main sleeve shaft 31 or 131 of the primary transmission 30 and is connected at its one end with the friction clutch 20 and at its other end with the auxiliary transmission 10 or 110. Thus, the input shaft 11 or 111 acts as a torsion bar to reduce unpleasant shocks given to the transmission unit upon engagement of the friction clutch 20 or engine braking operation. Furthermore, in practice of the present invention, it is to be noted that a hydraulic shifting mechanism may be adapted to automatically shift the auxiliary transmission responsive to travel speed of the vehicle.

Although certain specific embodiments of the present invention have been shown and described, it is obvious that many modifications and variations thereof are possible in light of these teachings. It is to be understood therefore that within the scope of the appended claims, the invention may be practiced otherwise than as specifically described herein.

What is claimed is:
1. A power transmission unit for a motor vehicle comprising:
   an elongated input shaft drivingly connected to an output shaft of an engine through a disengageable coupling;
   a primary transmission having an elongated main sleeve shaft in surrounding relationship to said input shaft, a countershaft arranged in parallel with said main sleeve shaft, change-speed gearing means mounted in association with said main sleeve shaft and said countershaft and selectively operable to provide a plurality of forward speed ratios and at least one reverse speed ratio between said main sleeve shaft and said countershaft, and shift means;
   a final drive gearing drivingly connected to said countershaft to drive a differential gear unit;
   an auxiliary transmission having a sun gear rotatably mounted on said input shaft, a ring gear integral with said main sleeve shaft, a planet carrier integral with said input shaft, a plurality of planet gears rotatably mounted on said planet carrier, said planet gears being in mesh with said sun gear and said ring gears, a selector gear unit comprising a first spline drivingly connected to said sun gear, a reaction member stationary with respect to said auxiliary transmission, a slide solidly engaged with said spline and said planet carrier and also with said spline and said reaction member, said primary transmission being arranged between said disengageable coupling and said auxiliary transmission.

2. A power transmission unit for a motor vehicle comprising:

an elongated input shaft in the form of a torsion bar drivingly connected to an output shaft of an engine through a disengageable coupling;

a primary transmission having an elongated main sleeve shaft in surrounding relationship to said input shaft, a countershaft arranged in parallel with said main sleeve shaft, change-speed gearing means mounted in association with said main sleeve shaft and said countershaft and selectively operable to provide a plurality of forward speed ratios and at least one reverse speed ratio between said main sleeve shaft and said countershaft, and shift means for selectively shifting said change-speed gearing means;

a final drive gearing drivingly connected to said countershaft to drive a differential gear unit;

an auxiliary transmission having an input member integral with said elongated input shaft and an output member integrally connected with said main sleeve shaft to drive said primary transmission at the shifted position, said primary transmission being arranged between said disengageable coupling and said auxiliary transmission, and said auxiliary transmission arranged to be shifted to a first position in which said output member is driven at the same speed as that of said input member and to a second position in which said output member shaft is driven at a higher speed than that of said input member.

3. A power transmission unit as claimed in claim 2, wherein said auxiliary transmission comprises a planetary gear set and a reaction member fixed to the transmission housing, said planetary gear set including a sleeve shaft in surrounding relationship to said input member, a sun gear integral with said sleeve shaft, a carrier member integral with said input member, a ring gear integral with said output member, and a planet gear rotatably supported by said carrier member and in mesh with said sun gear and said ring gear, said auxiliary transmission further comprising a selector gear unit for selectively connecting said sleeve shaft to said carrier member and said reaction member.

* * * * *